United States Patent [19]

Matsuo

[11] Patent Number: 5,734,895

[45] Date of Patent: Mar. 31, 1998

[54] FILE RECOVERY SYSTEM

[75] Inventor: Takashi Matsuo, Tokyo, Japan

[73] Assignee: NEC Corporation, Tokyo, Japan

[21] Appl. No.: 350,120

[22] Filed: Nov. 29, 1994

[30] Foreign Application Priority Data

Nov. 29, 1993 [JP] Japan ................................. 5-297946

[51] Int. Cl.⁶ .................................................. G06F 17/30
[52] U.S. Cl. ............... 395/618; 395/182.04; 395/182.06; 395/182.18
[58] Field of Search ......................... 395/601, 618, 395/180, 181, 182.01, 182.02, 182.05, 182.06, 182.07, 182.08, 182.09, 182.11, 182.13, 182.14, 182.18

[56] References Cited

U.S. PATENT DOCUMENTS

| | | | |
|---|---|---|---|
| 5,086,502 | 2/1992 | Malcolm | 395/182.06 |
| 5,276,860 | 1/1994 | Fortier et al. | 395/182.04 |
| 5,412,801 | 5/1995 | De Remer et al. | 395/182.18 |
| 5,446,884 | 8/1995 | Schwendemann et al. | 395/600 |
| 5,455,946 | 10/1995 | Mohan et al. | 395/600 |

OTHER PUBLICATIONS

"ACOS–6/MVX II Data Management File Management Supervisor User's Guide", FFB5IE-3, NEC Corporation, (1991), pp. 1–25.

Primary Examiner—Thomas G. Black
Assistant Examiner—Ruay Lian Ho
Attorney, Agent, or Firm—Foley & Lardner

[57] ABSTRACT

A saving tape is previously produced once on producing a file, and a block image after updating the file by a process group continues to be accumulated in a journal tape group. At an optional timing, a tape roll-forward process repeats to perform a roll forward for the saving tape and to produce a new saving tape in accordance with a journal accumulated into the journal group. On occurrence of fault in the file, a recovery is performed using the new saving tape and the journal tape group newly accumulated on and after the time of the final roll forward process.

6 Claims, 4 Drawing Sheets

FILE RECOVERY SYSTEM

BACKGROUND OF THE INVENTION

I. Field of the Invention

This invention relates to a file recovery system which, when a fault of the file occurs, preserves a journal on updating and, on occurrence of such fault a roll forward using the journal is performed to recover the file to a latest status.

II. Description of the Prior Art

Conventionally, a recovery of a faulty file requires a saving tape for saving the file contents before occurrence of the fault, and all journal tapes existing between the instant of starting execution of a saving process and at the instant immediately before occurrence of the fault, as shown in "ACOS-6/MVX II Data Management File Management Supervisor User's Guide" FFB51E-3, NEC Corporation, 1991.

In this arrangement, a large amount of tapes must be managed, thus a considerably long time is needed disadvantageously for the recovery by a roll forward of all contents of the journal tapes.

SUMMARY AND OBJECT OF THE INVENTION

An object of the invention is to completely recover in a short time a file which has been faulty. Another object of the invention is to completely recover in a short time a faulty file in accordance with only, a saving tape which has saved all the contents of the file before occurrence of the fault, and a latest journal tape.

Further another object of the invention is to minimize the amount of the journal tapes to be stored and to easily manage the journal tape.

More further, another object of the invention is to minimize the number of times of saving processes for all the contents of the file and to reduce a load for the system, which is generated due to execution of the saving process.

A file recovery system of a first aspect according to the invention, provides a constitution in that a tape roll-forward process performs a roll forward for a saving tape which stores backup of a file at an optional timing in accordance with a journal accumulated with a block image after updating of the file, produces a new saving tape, and enables recycle of the journal for which the roll forward is completed; and a roll forward process updates a file restored by the new saving tape by the journal accumulated with the block image after updating of the file on and after the time that the tape roll-forward process produces the new saving tape.

A file recovery system of a second aspect according to the invention provides a constitution in that: a process group updates a file into a block unit of a fixed length, a journal producing section produces a journal including a updating completed block image when updating the file, and outputs it to a journal tape, a saving process produces backup of the file previously into a saving tape when producing the file, a tape roll-forward process, performs a roll forward by the block image after being updated within the journal accumulated in the journal tape for the saving tape at an optional timing, produces a new saving tape, and enables recycle of the journal tape for which the roll forward is completed, a restoring process restores a file into a magnetic disk from the new saving tape on occurrence of fault of the file, and a roll forward process updates a file restored by the restoring process by the block image after being updated within the journal accumulated in the journal tape by the journal producing section on and after the time that the tape roll-forward process produces the new saving tape.

A file recovery system of a third aspect according to the invention, in the file recovery system of the second aspect, provides a constitution that the journal producing section produces a journal formed of a file name of the file, a block number of updated block, an updated date and time for the block, and a block image after being updated, and outputs it to a journal tape.

A file recovery system of a fourth aspect according to the invention, in the file recovery system of the third aspect, provides a constitution that the tape roll-forward process comprises a journal sort section in which a journal stored at a time series order in the journal tape is resequenced in ascending order for the block number in the journal and in descending order in an updated date and time for the same block number, and a saving tape updating section, which performs a roll forward for the saving tape through the use of a resequenced journal, produces the new saving tape, and enables recycle of the journal tape for which the roll forward is completed.

BRIEF DESCRIPTION OF THE DRAWINGS

The invention will be understood more fully from the detailed description given here below and from the accompanying drawings of preferred embodiments of the invention, which, however, should no be considered as limiting the invention but are for explanation and understanding only.

Here, it should be noted that like reference numerals represent like elements throughout the disclosure.

DETAILED DESCRIPTION OF THE PREFERRED EMBODIMENT

Figure 1:
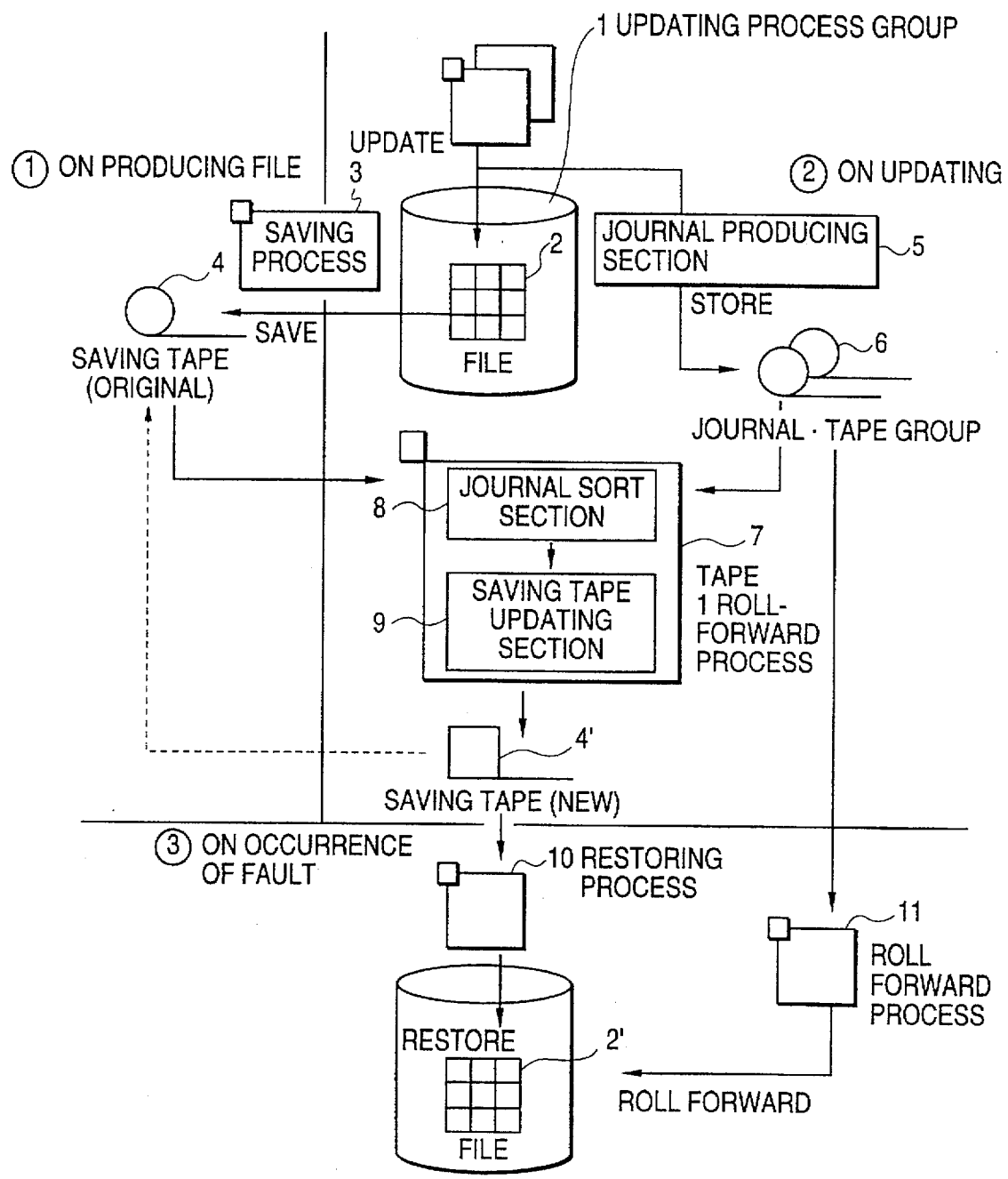
FIG. 1 is a block diagram showing one embodiment according to the invention.

One embodiment according to the invention is described in detail referring to the drawings.

In FIG. 1, a file recovery system of one embodiment according to the invention comprises a file 2 produced in condition of an available recovery by a roll forward procedure, an updating process group 1 that is a process group for updating the file 2 at every block unit basis, a journal producing section 5 for producing the journal on updating the file 2 and for outputting it to a journal tape group 6, a saving process 3 for previously producing a backup of the file into a saving tape 4 on producing the file 2, a journal sort section 8 in which the journal produced in a time series order within a journal tape group 6 is re-sequenced in ascending order for block number within the journal and in descending order of updated date and time for the same block number, a saving tape updating section 9 for performing the roll forward directly for a saving tape 4 through the use of the journal thus resequenced by the journal sort section 8, a tape roll-forward process 7 for performing the roll forward for the saving tape 4 at optional timing to produce a new saving tape 4' in accordance with an instruction by a system supervisor, a restore process 10 for restoring a file 2' onto a magnetic disk from the new saving tape 4' on occurrence of fault of the file 2, and a roll forward process 11 for updating a file after being updated by a block image, after updating, which is within the journal obtained from the journal tape group 6.

Figure 2:
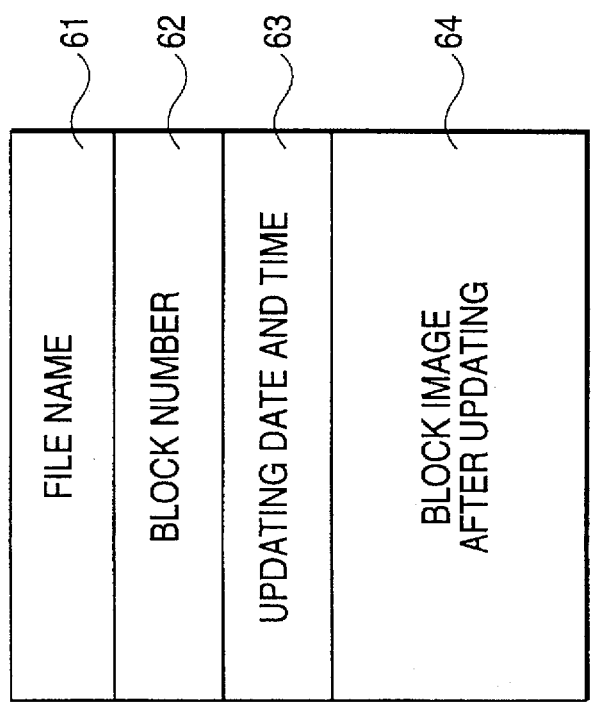
FIG. 2 is an illustrative view of one example of a journal in one embodiment according to the invention.

A construction example of the journal is shown in FIG. 2.

The journal includes a file name 61, a block number 62, an updating date and time 63, and a block image after updating 64. The file name 61 is a proper name for the file 2 as a system, and is used for selecting and classifying the journal for the file 2 at the time of roll forward of the tape which will be described later. The block number 62 is named in ascending order from the head block in the file, and designates a relative position within the file 2 of the block image 64 after being updated. The updating date and time 63 designates a date and time of producing the corresponding journal, and is used for resequencing into a conventional order on updating the same block number on sorting as described later.

An operation of one embodiment according to the invention is described referring to FIGS. 1 to 5.

First, in advance, the file 2 is saved into the saving tape 4 by the saving process 3 on producing the file, and a backup in a state before updating is prepared (step 31).

On operating the system, the file 2 is updated at every block unit basis by updating the updating process group 1, at this time, the journal producing section 5 produces a journal from the block image to be updated and outputs it to the journal tape group 6 (step 51).

Following operation of the system, the journal tape group 6 are accumulated. However, by starting the tape roll-forward process 7 at an optional timing by a system operator, the accumulated journals are reflected to the saving tape 4, the new tape 4' is thus produced, thereby it is possible to abandon the accumulated journals and to realize recycling of the journal tape.

Figure 3:
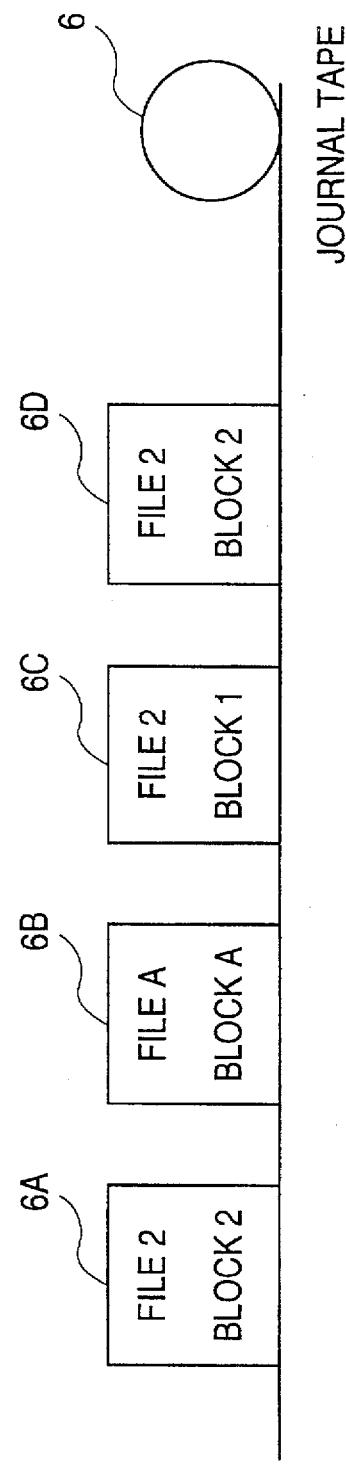
FIG. 3 is an illustrative view showing one example of contents of a journal tape in one embodiment according to the invention.
Figure 4:
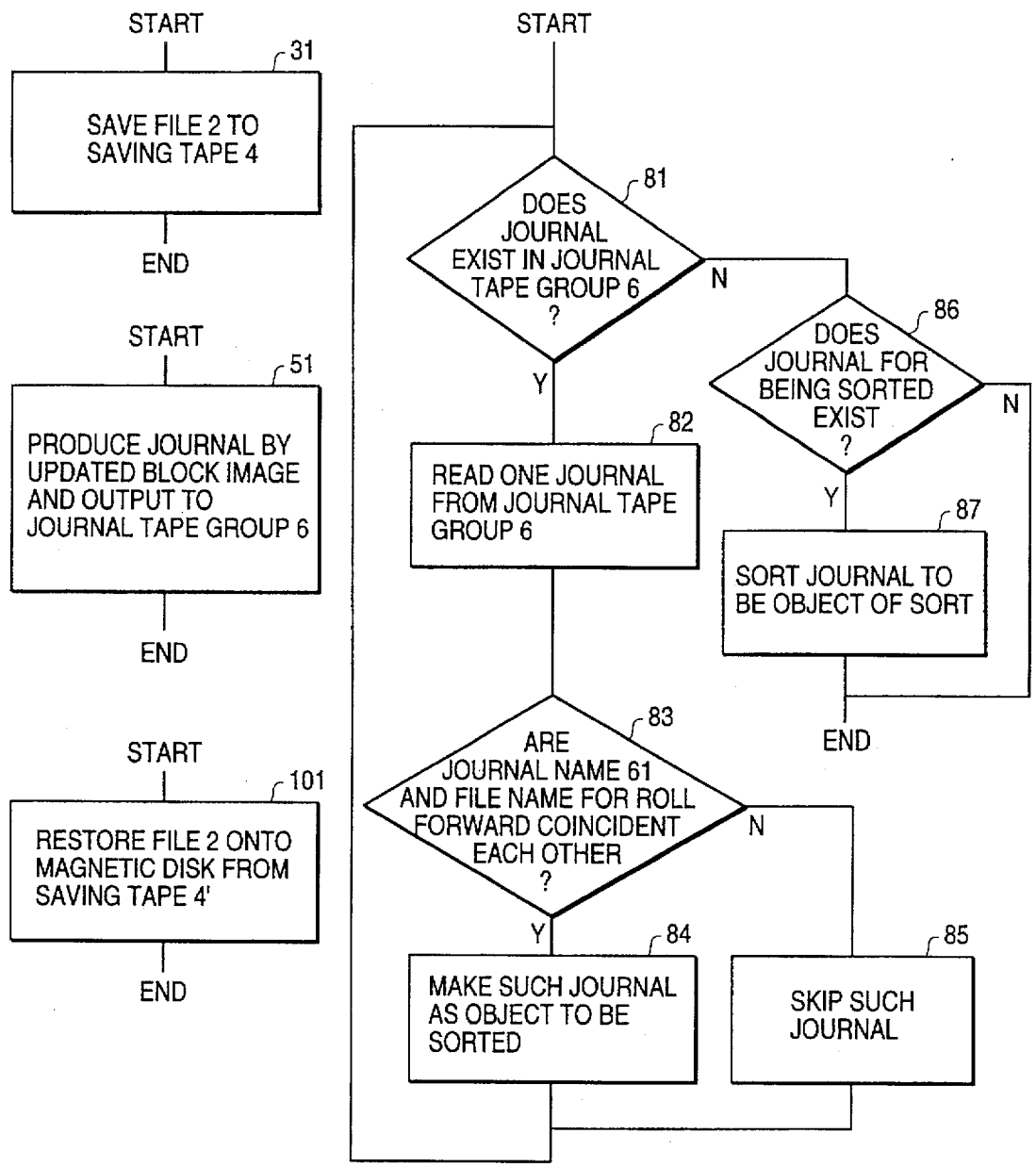
FIG. 4 is a flow chart showing a process of a saving process 3, a journal producing section 5, a journal sort section 8, and a restore process 10 in one embodiment according to the invention.
Figure 5:
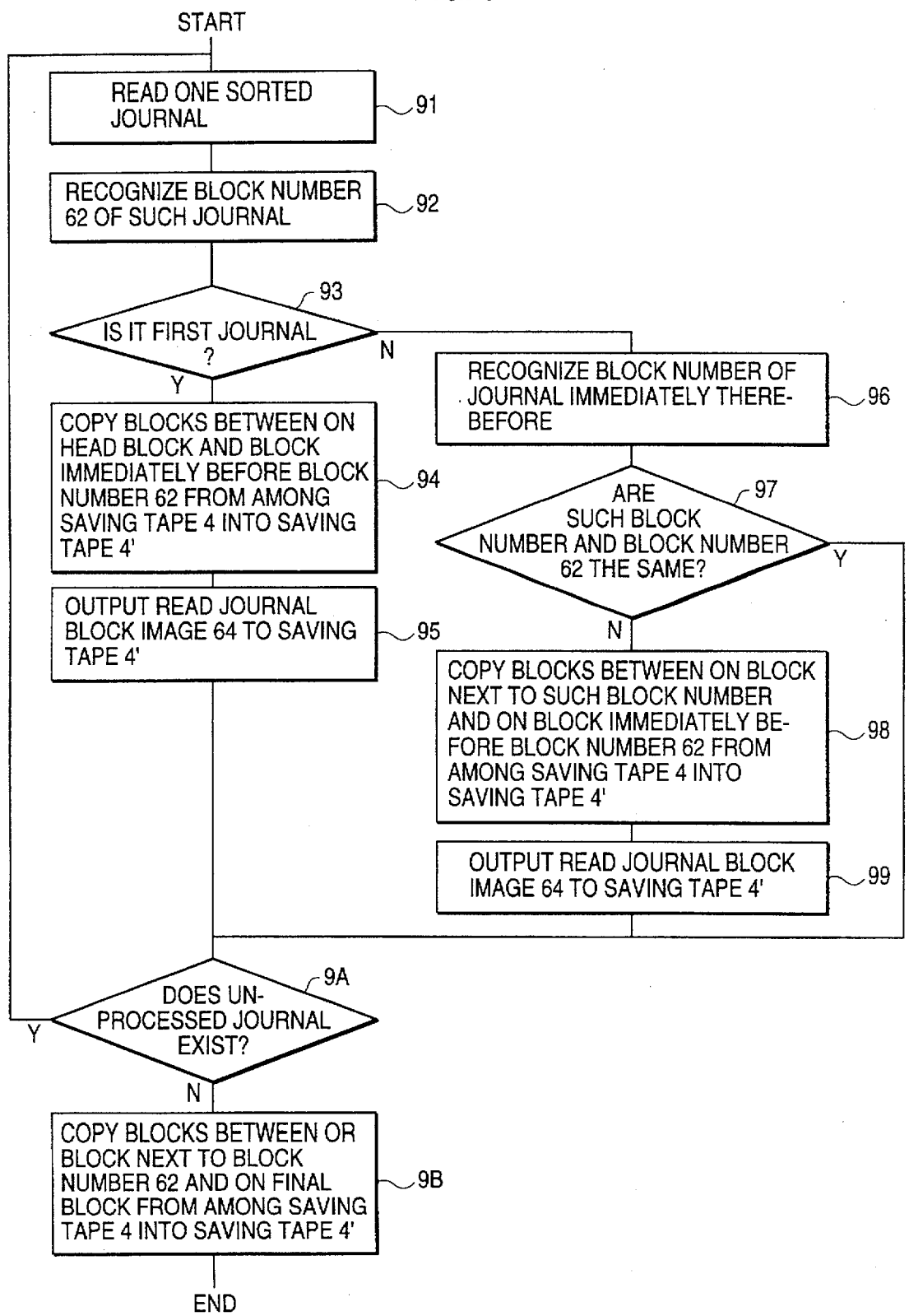
FIG. 5 is a flow chart showing a process of a saving tape updating section 9 in one embodiment according to the invention.

A roll forward procedure of the file 2 is shown in accordance with an arrangement status of the journal within the journal tape group 6 shown in FIG. 3.

The journal sort section 8 determines whether or not a journal is present in the journal tape group 6 (step 81), and if it is determined that the journal is present, one journal is read from the journal tape group 6 (step 82).

Next, the journal sort section 8 compares the file name 61 in thus read journal with a name of an object file for the roll forward designated by the system supervisor on starting the tape roll-forward process 7 (step 83), and if both are coincident to each other, such journal is made an object of sort (step 84), and if not coincident to each other, the journal is skipped (step 85). In the example of FIG. 3, a journal 6A, a journal 6C and a journal 6D come to an object of sort, a journal 6B is skipped because it is a journal for another file.

The journal sort section 8 returns to step 81 after completion of step 84 or step 85.

In step 81, if the journal sort section 8 determines that no journal is in the journal tape group 6, then in step 84, it is determined whether or not a journal to be an object of sort is present (step 86), and if it is determined that a journal to be an object of sort is present, the journal sort section 8 proceeds to sort (step 87).

Then, a first key of sort is the block number 62, where the alignment is assumed to be in ascending order, and a second key is the updating date and time 63, where the alignment is assumed to be in descending order.

A method of realizing a concrete sort is not a technique within a scope of the claims according to the invention, and thus a detailed explanation thereof is omitted throughout.

In case of FIG. 3, an alignment of the journal is in the order of the journal 6C, 6D and 6A.

The saving tape updating section 9 reads one journal after sorting by the journal sort section 8 (step 91), and recognizes the block number 62 of such journal (step 92).

The saving tape updating section 9 determines whether or not a journal being read in step 91 is a first journal from among journals sorted by the journal sort section 8 (step 93), and if determining it as the first journal, then copying into the saving tape 4' is performed for blocks existing between a head block and a block immediately before the block shown by the block number 62 recognized in step 92, from among the saving tape 4 saved by the saving process 3 (step 94). Further the block image 64 of the journal read in step 91 is output to the saving tape 4' (step 95).

In step 93, if the saving tape updating section 9 determines that it is not a head journal, the block number of a journal immediately before the journal read in step 91 is recognized (step 96).

In the saving tape updating section 9, it is determined whether or not the journal block number recognized in step 96 is the same as the block number 62 of the journal recognized in step 92 (step 97), and if it is determined that they are not the same block number, then copying into the saving tape 4' is performed for blocks existing between a block having a block number next to the block number recognized in step 96 and a block immediately before the block shown by the block number 62 recognized in step 92 (step 98). Further the block image 64 of the journal read in step 91 is output to the saving tape 4', from among the saving tape 4 (step 99).

In case where the saving tape updating section 9, after step 95, determines that the same block number is present in step 97, or in case after step 99, that is, on either one of above two, it is determined whether or not an unprocessed journal is present in the journal after sort by the journal sort section 8 (step 9A), and if presence of the journal is determined, the process returns to step 91.

If the saving tape updating section 9, even in step 9A, determines that an unprocessed journal is not present, then copying into the saving tape 4' is performed for blocks existing between a block having the block number next to the block number 62 recognized in step 92 and a final block, from among the saving tape 4. Thus the tape roll-forward process is terminated (step 9B).

In the example of FIG. 3, the block image 64 after updating within the journal 6D is read for the block 2, the journal 6A is skipped, and for contents of each block of the produced saving tape 4', a block 1 comes to a block image within the journal 6C, a block 2 comes to a block image within the journal 6D, and blocks there except become block images within the saving tape 4.

Thus produced saving tape 4' is stored instead of the saving tape 4, and so the saving tape 4 and the journal tape group 6 can be recycled.

Thereafter, following updating of contents of the file 2 by the updating process group 1, the new journal tape group 6 is accumulated, the tape roll-forward is required to be perform again. For such a case, the tape roll-forward is executed with reference to a procedure described above using the saving tape 4' and the newly collected journal tape group 6 as an input.

The system supervisor repeats the process of the above at an optional interval until fault of the file arises, and the operation is performed so as to prevent the stored amount of the journal from increasing.

On occurrence of fault in the file, the file 2 is restored on a magnetic disk from the saving tape 4', using the restore process 10 (step 101). The restored file 2 is an image at the instant of executing the final tape roll-forward, which is referred to as "file 2'".

In addition, using the journal tape group 6 between at the instant of execution of the final tape roll-forward and at the instant of occurrence of fault, then the roll forward is to be performed by the roll forward process 11, thus the file 2' is recovered to a state immediately before generation of the fault.

The roll forward process 11 employs the roll forward processing in the known operating system, therefore the detailed description is omitted.

In the foregoing, the process of the file recovery system, which is an operation of one embodiment according to the invention, is thus completed.

A feature of a file recovery system which is one embodiment according to the invention comprises the repeated processes each in that a saving tape 4 is once produced in advance on producing the file 2, on the other hand a block image after updating of the file 2 by the process group 1 is stored in the journal tape group 6, and at an optional instant, a tape roll-forward process 7 performs the roll forward for the saving tape 4 in accordance with journals accumulated in the journal tape group 6, thereby a new saving tape 4' is produced. A further feature is that, when a fault arises in the file, a recovery is performed by using the new saving tape 4' and the journal tape group 6 newly stored on and after the final roll forward process.

In effect with this construction being employed, the file recovery system of one embodiment according to the invention is capable of completely recovering the faulty file in a short time in accordance with a saving tape that saves the entire contents of the file only once before occurrence of the fault, and with only one newest journal tape.

As hereinbefore fully described, the invention is capable of completely recovering the faulty file in a short time.

Further, the invention is capable of completely recovering the faulty tape in accordance with only the saving tape which has saved the entire contents of the file before occurrence of the fault, and with the newest journal tape.

More further, the invention is capable of easily managing the journal tape because the amount of the journal tapes to be stored can be minimized.

Still more further, the invention is capable of reducing a load, for the system, which is produced by executing the saving process because the number of times of saving processes for the entire contents of the file can be minimized.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A file recovery system comprising:
   a tape roll-forward unit configured to perform a roll forward for a saving tape and for storing a backup of a file at an optional timing in accordance with a journal accumulated with a block image after updating of the file, said tape roll-forward unit configured to produce a new saving tape, and to enable recycle of the journal for which the roll forward is completed; and
   a roll forward unit configured to update a file restored by the new saving tape by the journal accumulated with the block image after updating of the file on and after the time that the tape roll-forward process produces the new saving tape.

2. A file recovery system comprising:
   a process unit configured to update a file into a block unit of a fixed length;
   a journal producing unit connected to the process unit and configured to produce a journal including an updating completed block image when updating the file, and configured to output the journal to a journal tape;
   a saving configured to produce a backup of the file into a saving tape at a time when the file was created;
   a tape roll-forward unit connected to the journal producing unit and to the saving unit, the tape roll-forward unit configured to perform a roll forward by the block image after being updated within the journal accumulated in the journal tape for the saving tape at an optional timing, and configured to produce a new saving tape, and and to enable recycle of the journal tape for which the roll forward is completed;
   a restoring unit connected to receive the new saving tape from the tape roll-forward unit and configured to restore a file into a magnetic disk from the new saving tape on occurrence of a fault of the file; and
   a roll forward unit connected to the journal producing unit and to the restoring unit, the roll forward unit configured to update a file restored by the restoring process by the block image, after being updated, which is within the journal accumulated in the journal tape by the journal producing unit on and after the time that the tape roll-forward unit produces the new saving tape.

3. A file recovery system as claimed in claim 2, wherein the journal producing unit produces a journal formed of a file name of the file, a block number of an updated block, an updated data and time for the block, and a block image after being updated, and outputs the journal to the journal tape.

4. A file recovery system as claimed in claim 3, wherein the tape roll-forward unit comprises:
   a journal sort section in which a journal stored at a time series order in the journal tape is resequenced in ascending order for the block number in the journal and in descending order in an updated data and time for the same block number; and
   a saving tape updating section, which performs a roll forward for the saving tape through the use of a resequenced journal, produces the new saving tape, and enables the recycle of the journal tape for which the roll forward is completed.

5. A file recovery method, comprising the steps of:
   a) recording entire contents of a file onto a saving tape at a first time when the file is produced;

b) updating the file at a second time later than the first time;

c) storing, as a journal, a block image of the updated file in a journal tape group;

d) repeating steps b) and c) for as many times as an operator performs a separate updating of the file;

e) producing, by a tape roll-forward unit, a new saving tape by executing a roll-forward operation for the saving tape in accordance with each journal accumulated in the journal tape group;

f) recovering, by a roll forward unit, the file based on the new saving tape; and g) updating the recovered file based on each journal which have been stored in the journal tape group since the time the new saving tape was produced in the step e).

6. A file recovery method as claimed in claim 5, further comprising the step of:

h) detecting a fault in the file, and performing the steps f) and g) in order to update the recovered file.

* * * * *